UNITED STATES PATENT OFFICE.

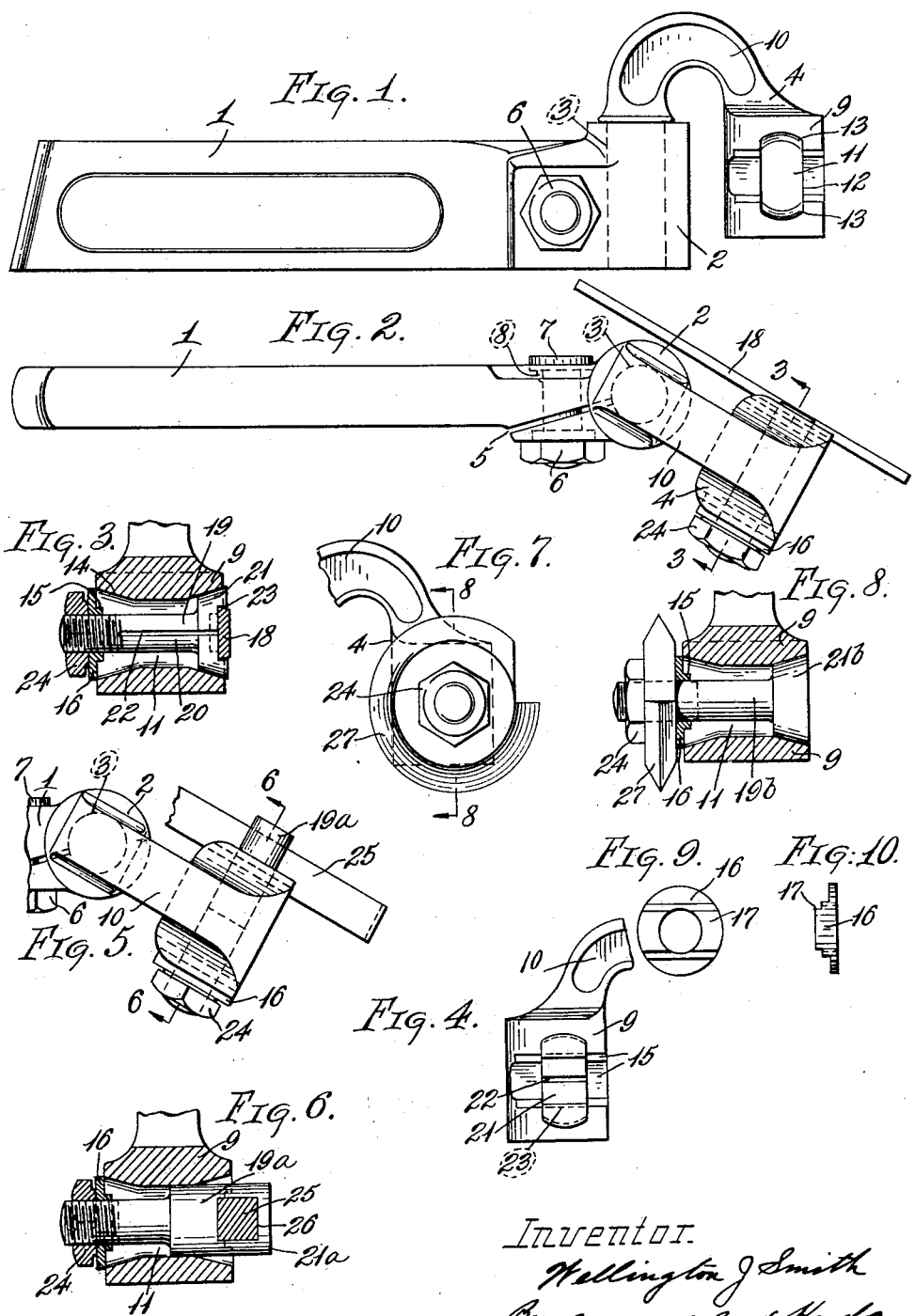

WELLINGTON J. SMITH, OF CLEVELAND, OHIO.

TOOL HOLDER.

1,409,254.　　　　Specification of Letters Patent.　　Patented Mar. 14, 1922.

Application filed May 28, 1919. Serial No. 300,308.

*To all whom it may concern:*

Be it known that I, WELLINGTON J. SMITH, a citizen of the United States, residing at Cleveland, in the county of Cuyahoga and State of Ohio, have invented certain new and useful Improvements in Tool Holders, of which the following is a specification.

This invention relates to yielding tool holders, such as are used for holding cutting tools in a lathe.

The object of the invention is to provide a simple, strong tool holder which permits some yield of the tool and which is adapted to properly hold and support various kinds of tools in various positions, both at the right and at the left of the tool holder, and which performs said functions with a minimum number of parts all capable of simple manipulation and adjustment.

Further objects of the invention are in part obvious and in part will appear more in detail hereinafter.

In the drawings, Fig. 1 illustrates a side elevation of one form of tool holder embodying the invention, the tool and clamping member being omitted; Fig. 2 is a plan view illustrating a cutting off tool in place; Fig. 3 is a detail cross section on the line 3—3, Fig. 2, looking in the direction of the arrows; Fig. 4 is a side view from the right in Fig. 3, the tool being omitted; Fig. 5 is a plan view, corresponding to Fig. 2 and illustrating another form of tool; Fig. 6 is a cross section on the line 6—6, Fig. 5; Fig. 7 is a side view illustrating another tool; Fig. 8 is a cross section on the line 8—8, Fig. 7; and Figs. 9 and 10 are detail side and edge views of a washer.

The tool holder shown in the drawings comprises the usual shank or body 1 of proper form to be clamped or secured in the tool carriage of the lathe. One end of said shank is provided with a sleeve like yielding clamping member 2 to receive the post 3 of the tool carrying member 4. Said clamping member may be of any suitable form and in the present instance is integral with the tool shank and made yielding by slotting said shank, as at 5, along a diagonal line from one side to the cylindrical sleeve opening. The clamping member may be tightened around the tool post to hold the same in any angular position to which it may be turned by tightening up the clamping nut 6 on a bolt 7 passing through the split portion of the shank across the slot 5, said bolt preferably being provided with a side dowel pin or projection 8 fitting a like opening in the shank to prevent turning movement of the bolt.

The tool carrying member 4 is provided with a head 9 to which the tool is secured, and which is connected to the post 3 by an arched or curved portion 10, which is strong and sturdy but yet has some resiliency to permit yield of the tool carrying head relative to the fixed shank.

Head 9 has a laterally extending passage or opening 11 with parallel vertical walls 12 and arched upper and lower surfaces 13, the outer portions of which, as indicated at 14, Fig. 3, are tapered or converge inwardly. At each end of said opening the outer vertical face of the head is slotted horizontally to provide one or more recesses or channels 15, (two being shown), which successively are narrower and of increasing depth, and whose purpose will appear. 16 indicates a washer provided along one face with a stepped rib or projection 17 of complementary form to the channels 15 for mating or interfitting relation therewith.

The tool holding head thus described is adapted to hold and secure all of the usual forms of metal cutting lathe tools. For example, 18 indicates a cutting off tool, having a narrow cutting edge at its front end and which tool is of considerable depth for purposes of rigidity. This tool is held in a member 19, somewhat like a bolt in form and provided with a shank 20 and a head 21 shaped to fit the tapering end of the opening or channel 11. Said member is slotted longitudinally through its head and part way along the shank, as indicated at 22, and the outer surface of the head is provided with an undercut recess or channel 23 spanning the slot 22, as shown in Fig. 3. The cutting off tool is placed in the channel 23 and member 19 is passed through the opening in the head and secured to said head by screwing up the nut 24 against the washer 16 whose rib interlocks with the channels or recesses 15 of the head. The cutting off tool lies in the outer channel or recess 15 and as the nut 24 is screwed up is clamped tightly in place by the split head 21, whose parts are drawn together by the wedging action of the tapering surface 14. The cutting off tool can be of any suitable length as it lies at one side of the sleeve 2, as shown in Fig. 2.

Said cutting off tool can also be secured to either side of the head and turned to any angular position around the axis of the post 3.

The device is also suitable for supporting tools having shanks of other cross section, such as round or square. Figs. 5 and 6 illustrate the securement of a square shank tool 25, which is held in an opening 26 in a tool holding member 19ª whose head 21ª is of solid form and passes through the head opening 11. With this arrangement the tool 25 lies in one or the other of the recesses 15 and is clamped to the head by the nut 24, as before stated. The clamping member is reversible so that the tool can be held on either side of the head. Round tools are supported in the same manner.

Figs. 7 and 8 illustrate the ordinary disc threading tool 27 which may be supported on either side of the head 9. To support said tool I provide a holding member 19ᵇ having a solid head 21ᵇ fitting the tapering end of the opening, and clamp the tool between the washer 16 and clamping nut 24.

It is obvious that the holder described, by its various adjustments, can bring the tool into proper cutting relation with any part of the work, such as in restricted corners at either the right or the left hand of the work. It also provides for clamping any kind of tools with a minimum number of parts.

What I claim is:—

1. A tool holder, comprising a shank, a tool carrying member secured to one end thereof and having a head provided with a transverse aperture, said head having tool receiving seats at both ends of said aperture.

2. A tool holder, comprising a shank, a tool carrying member secured to one end thereof and having a head provided with a transverse aperture, said head having a plurality of tool receiving recesses of different depths at both ends of said aperture.

3. A tool holder, comprising a shank, a tool carrying member secured to one end thereof and having a head provided with a transverse aperture, said head having tool receiving seats at both ends of said aperture, said aperture having tapered portions at both ends, and a tool carrying and clamping member extending through said aperture and provided at one end thereof with a head having a tapered portion.

4. A tool holder, comprising a shank, a tool carrying member secured to one end thereof and having a head provided with a transverse aperture, said head having a plurality of tool receiving recesses of different depths at both ends of said aperture, said aperture having tapered portions at both ends, and a tool carrying and clamping member extending through said aperture and provided at one end thereof with a head having a tapered portion.

In testimony whereof I affix my signature.

WELLINGTON J. SMITH.